Figure 4A:
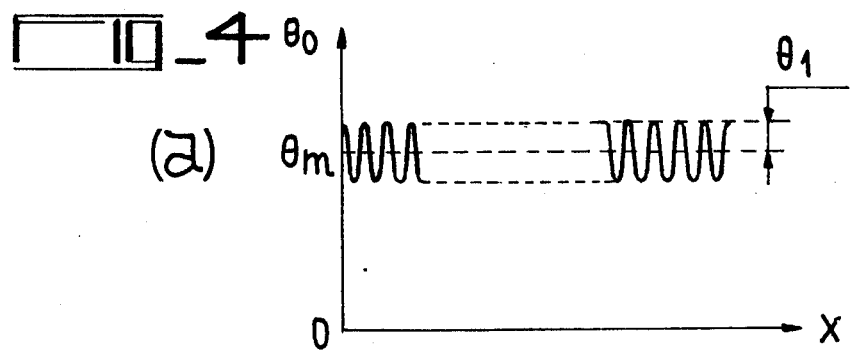

United States Patent [19]

Felix et al.

[11] 4,158,136
[45] Jun. 12, 1979

[54] CAMERA SYSTEM EMPLOYING PYROELECTRIC EFFECT

[75] Inventors: Pierre Felix; Lucien Guyot, both of Paris, France

[73] Assignee: Thomson-CSF, Paris, France

[21] Appl. No.: 839,635

[22] Filed: Oct. 5, 1977

[30] Foreign Application Priority Data

Oct. 8, 1976 [FR] France .................. 76 30288

[51] Int. Cl.² ............................................ H01J 31/49
[52] U.S. Cl. .................................... 250/330; 250/334
[58] Field of Search ............... 250/330, 338, 340, 342, 250/351, 334

[56] References Cited

U.S. PATENT DOCUMENTS 3,291,991 12/1966 Welti .................................. 250/351
3,774,043 11/1973 Le Carvennec .................... 250/330

Primary Examiner—Davis L. Willis
Attorney, Agent, or Firm—Roland Plottel

[57] ABSTRACT

A camera system, in particular for the detection of infrared radiation, wherein the detector uses the pyroelectric effect.

It permits the viewing of fixed object owing to a time modulation of the radiation coming from such objects. This modulation is achieved by means of a partly transparent grid which moves between the object and the radiation detector.

15 Claims, 10 Drawing Figures

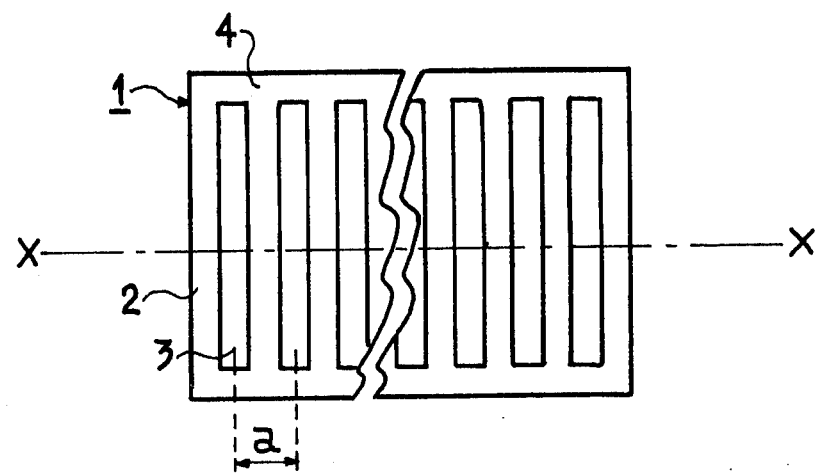
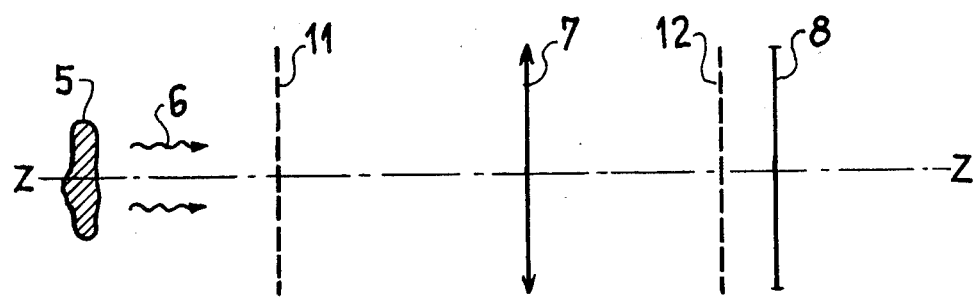
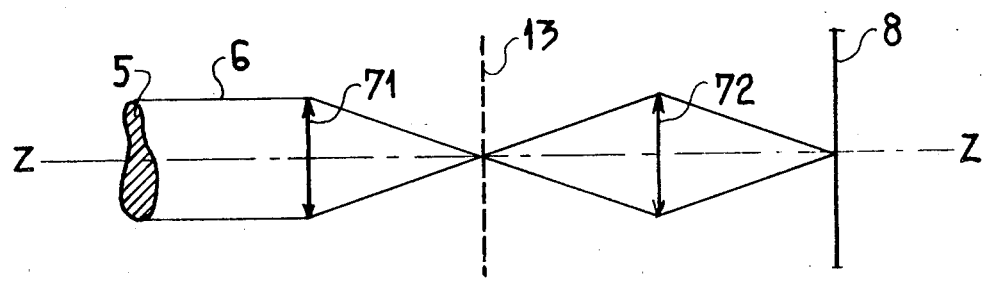

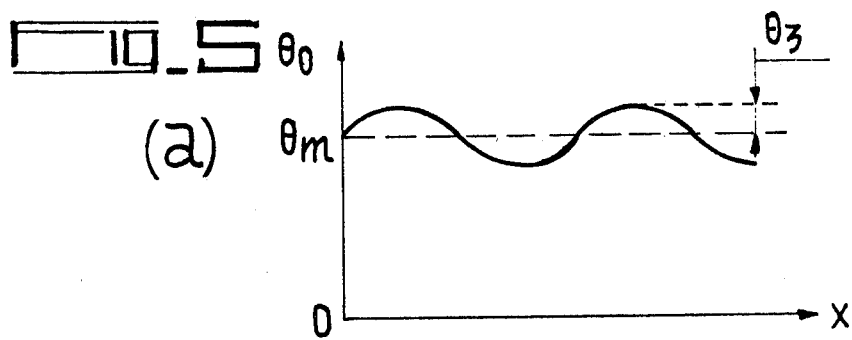
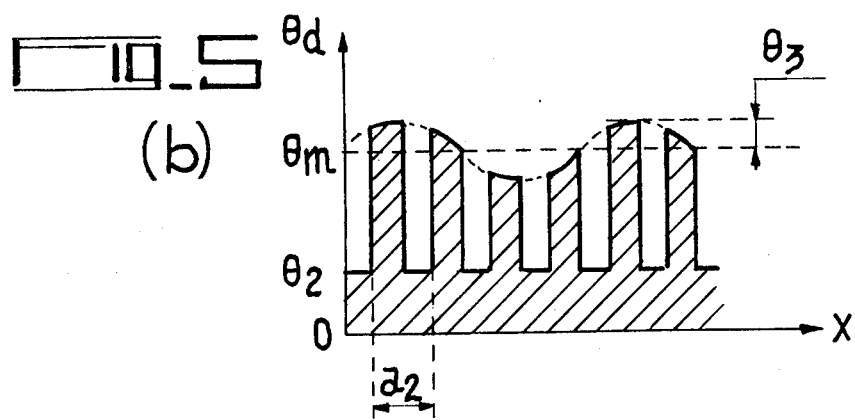
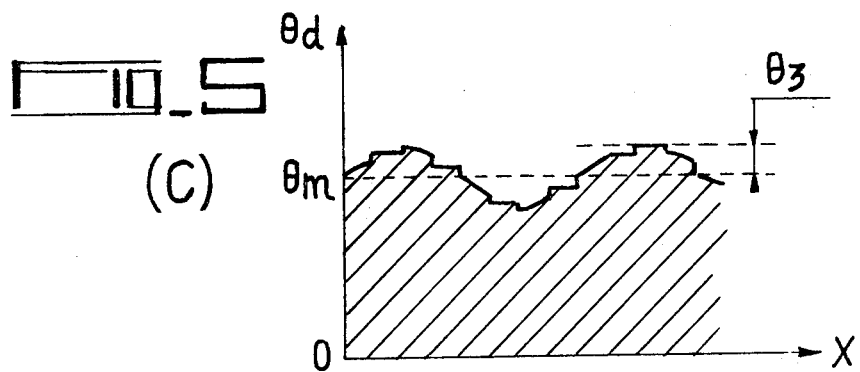

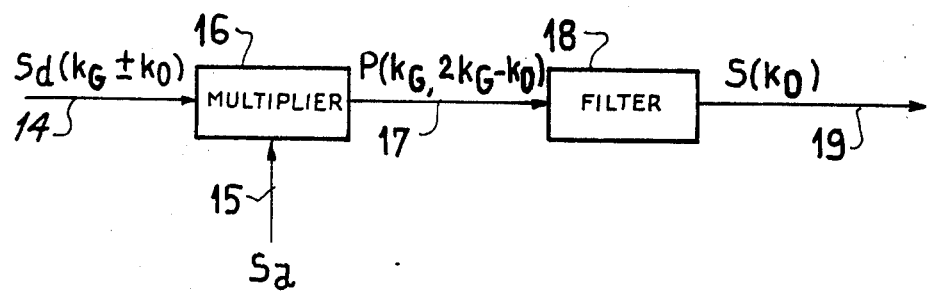
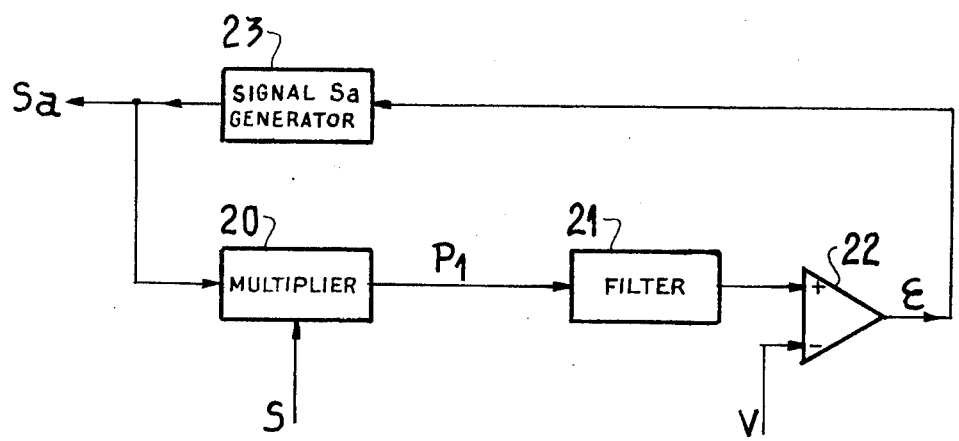

CAMERA SYSTEM EMPLOYING PYROELECTRIC EFFECT

The present invention relates to camera systems employing radiation detectors which use a pyroelectric effect.

As it is well known, the pyroelectric effect consists in the generation, on certain materials and under the action of a radiation, of a spatial distribution of electric polarization on the surface of the material, which corresponds to the spatial distribution of the temperature of the radiation.

This effect is employed for taking pictures in the thermal infrared domain in particular, by means of either cathode ray tubes, the target of which is constituted by a pyroelectric material, or, more generally, devices the detecting surfaces of which is constituted by a linear or two-dimensional mosaic of pyroelectric detectors from which information is taken sequentially in the form of an electric voltage or current by solid-state sensors. As is known, the scanning of the distribution of the charges induced on the surface of a pyroelectric detector can be achieved sequentially according to one of the following methods:

neutralization of the induced electric charges by a supply of external electric charges. This type of scanning is employed in particular in camera tubes having a pyroelectric target mentioned before, in which the electron beam itself supplies the neutralizing charges. This type of scanning is destructive and only permits detecting at each point the variation of temperature at this point between two scanning instants;

scanning of the induced potentiel by a sensor whose input impedance is high enough so that the electric time constant is large with respect to the duration of the scanning. This type of scanning is not destructive but the information stored in the pyroelectric detector nonetheless deteriorates with a time characteristic at the most equal to the dielectric relaxation time of the pyroelectric material. Further, it permits detecting at each point only the variation of the induced potential, and therefore the temperature variation at this point, between two scanning instants.

Thus it can be seen that, in both cases, it is only possible to obtain a permanent information if at each point of the detector surface the temparature undergoes temporal or time variations.

Moreover, in order to obtain a sufficient spatial resolution and owing to lateral thermal leakages, these variations must be sufficiently rapid. The viewing of fixed objects is therefore only possible by an auxiliary time modulation of the temperature at each point of the detector surface.

For this purpose, different processes are known, among which may be mentioned:

(1) the permanent displacement of the image of the object on the detector surface, either by displacing with respect to the object the whole of the camera system, or by displacing solely the image of the object by an optical device effecting a deflection which varies with respect to time. One drawback of this method is the limitation of the utilization of the detector surface and results in an increased complexity of the system, especially in its second version;

(2) the periodic interruption of the incident radiation on the detector surface by means of a mechanical stop or chopper; this method has the advantage of maintaining the image of the object fixed on the detector surface but requires for a correct restitution a treatment of the video signal since, as is known, during the periods of interruption of the incident flux the useful signal is inverted with respect to the signal received outside these periods. It also requires a synchronization between the stopping and the scanning of the detector surface. Lastly, it is hardly suitable for cathode ray tubes in as much as the electron beam is hardly able to follow, within times of the order of an image frame, the sudden variations of potential on the detector surface;

(3) the periodic time variation of the focusing of the image on the detector surface (process termed focusing-defocusing). This process, which is simpler to carry out than the preceding process, however has all the drawbacks thereof with, in addition, that of being incapable of being synchronized with the scanning, which results in a useful signal loss.

According to the invention there is provided a camera system comprising:

—a detector of an incident radiation from an object to be viewed, said detector being constituted by a pyroelectric material on which the incident radiation produces a spatial distribution of electric potential representing it;

—means for scanning said potential distribution;

—a partly transparent grid which moves between the object and the detector and produces a time continuous modulation of said incident radiation.

For a better understanding of the invention, and to show how it can be carried into effect, reference will be made to the following description, which is given by way of a non-limitative example and illustrated by the accompanying drawings which represent:

FIG. 1, an embodiment of the grid used in the system according to the invention;

FIG. 2, a diagram showing different possible positions for the grid used in the system according to the invention;

FIG. 3 a variant of the preceding Figure;

FIGS. 4 (a–b) and 5 (a–c), diagrams of the temperatures of the object and of the radiation received on the detector surface of the system according to the invention;

FIGS. 6 and 7, diagrams illustrating the processing of the electric signal furnished by the detector surface of the system according to the invention.

In these different Figures, like references refer to like elements.

FIG. 1 represents an embodiment of the grid carrying the reference 1 and constituted by a plate 2 which is perfectly absorbent, that is to say which may be likened to a black body, in which apertures 3 have been formed. The dimensions of the apertures 3 are such that the transparency of the grid 1 is ½, the edge portion 4 of the grid being ignored. In the embodiment of the Figure, the apertures 3 are disposed with a constant pitch (a) and have a rectangular shape which is elongated in a direction perpendicular to the axis X X.

FIG. 2 is a diagram showing different possible positions for such a grid in the system according to the invention.

In this Figure, there is shown an object 5 to be viewed, the radiation 6 which issues therefrom, a lens 7 diagrammatically representing the focusing device of the system and a pyroelectric detector surface 8. These different elements are in alignment on an axis ZZ which is perpendicular to the plane of the detector surface 8.

In this assembly, the grid may be located either between the object 5 and the focusing optic 7, that is to say in plane 11 in FIG. 2, or between the focusing optics 7 and the detector surface 8, that is to say in plane 12. In either case, it is perpendicular to the axis ZZ.

The grid 1 shown in FIG. 1 moves with a uniform speed or undergoes a to-and-from movement along the axis XX and perpendicular to the axis ZZ.

Further, the spatial frequency of this grid with respect to the region of the detector surface 8 (in FIG. 2) and bearing in mind the magnification of the optics lens 7, may be high, of the order of the maximum spatial frequency possible in the region of the detector surface 8, or, an the contrary, very low, lower than the minimum spatial frequency in the region of this same surface 8.

When this spatial fequency is high, it is preferable that the grid be placed very close to the object 5 or very close to the focusing plane which is coincident with the detector surface 8, the maximum distances depending on the field depth and therefore on the numerical aperture of the objective which forms the image of the object in the plane of the detector surface.

Now, in certain devices and in particular those employing a camera tube, the grid cannot be placed very close to the detector surface owing to the thickness of the input window. This difficulty may be avoided by means of the system diagrammatically represented in FIG. 3 which forms an intermediate image of the object in a plane where the grid may be placed.

In FIG. 3, there is therefore the object 5 and the radiation 6 from the object. The optical system of the device comprises two objectives 71 and 72 whereby it is possible to obtain an intermediate image of the object 5 in a plane 13 in which the grid can be placed, and an image of the object 5 on the detector surface 8.

There have been described above grids having a low or high spatial frequency in which the solid part may be likened to a black body. In this case, the parts of the detector surface located in front of the solid parts of the grid see the effective temperature of this grid. But it is also possible to construct these solid parts from a material which diffuses the incident radiation: the parts of the previously considered detector surface then see only a mean temperature of the object. These solid parts may also be made from a transparent material, the effect of which is to locally defocus the image. The last two modifications produce noticeable effects only in the case of grids of low spatial frequency, as shown hereinafter.

Figure 4B:
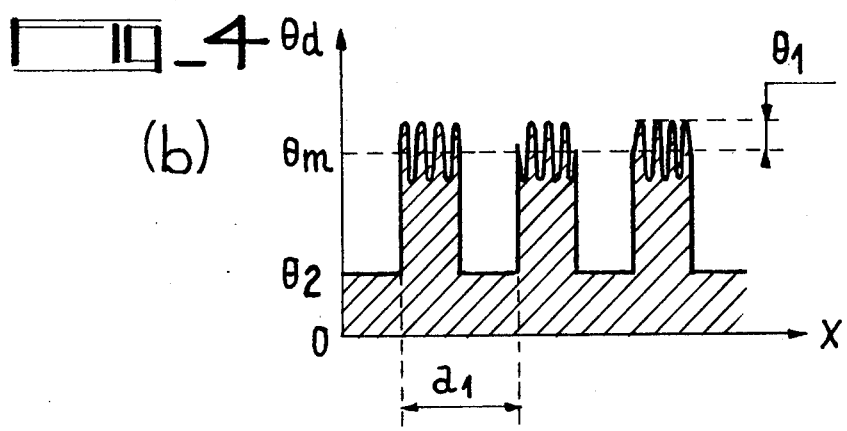

FIG. 4a represents a temperature diagram of the object ($\theta_o$) and FIG. 4b represents the incident radiation on the detector surface ($\theta_d$), in the case where the spatial frequency of the grid is low.

In FIG. 4a, there is shown the mean temperature $\theta_m$ of the object on an axis parallel to the axis XX of FIG. 1, and one of the Fourier spatial components of the temperature of the object, which is sinusoidal and of amplitude $\theta_1$ about the mean temperature $\theta_m$.

In FIG. 4b, there is shown the temperature of the incident radiation which corresponds to the component of the temperature of the object of FIG. 4a and to a grid of low spatial frequency. A rectangular pulse function is obtained whose period ($a_1$) is that of the grid and whose amplitude is equal to the difference ($\theta_m - \theta_2$) between the mean temperature of the object ($\theta_m$) and the temperature of the grid ($\theta_2$). In the parts of this rectangular pulse function which correspond to the aperture of the grid, this function is modulated by the component of FIG. 4a due to the object, with $\theta_1$ substantially less than the difference ($\theta_m - \theta_2$).

When the grid is made from a diffusing or defocusing material, the temperature $\theta_2$ of the solid parts of the grid seen by the detector surface is equal to the mean temperature $\theta_m$ of the object. Thus, the resulting effect of the grid in this case remains noticeable.

FIGS. 5 relate to a grid having a high spatial frequency comparable to the highest object spatial frequencies that are desired to be transmitted.

FIG. 5a represents a temperature diagram ($\theta_o$) of the object on an axis parallel to the axis XX of FIG. 1. There can be seen the mean temperature $\theta_m$ of the object and one of the Fourier spatial components of the temperature of the object, which is sinusoidal and of amplitude $\theta_3$ around the mean temperature $\theta_m$.

FIG. 5b represents a temperature diagram ($\theta_d$) of the radiation received by the detector surface and in which there is, as in the case of FIG. 4b, a rectangular function the parameters of which (period $a_2$ and amplitude $\theta_m - \theta_2$) are defined by the grid modulated by the component of the radiation of FIG. 5a, with $\theta_3$ substantially less than the difference ($\theta_m - \theta_2$).

FIG. 5c is also a diagram of the temperature of the incident radiation on the detector surface ($\theta_d$) but in the case where the grid is made from a diffusing or defocusing material. It is found that the incident radiation such as represented in FIG. 5a is only but slightly modulated by the presence of the grid.

As concerns the spectrum of the spatial frequencies of the radiation absorbed by the detector 8 of FIG. 2 (or 3), it may be scanned in the following way: the grid, of transparency $\frac{1}{2}$ and of spatial frequency $k_G = 2\pi/a$, moves along axis XX with a uniform speed. Each Fourier component of the incident radiation, of spatial frequency $k_o$, must therefore be multiplied by a rectangular pulse function which has alternately the values 0 and 1, with a spatial period a, to translate the interception of the incident radiation by the grid. This gives, in decomposing the rectangular pulse function into series:

(1) the product of the incident radiation and the mean value ($\frac{1}{2}$) which is invariable with respect to time for a fixed object and which therefore gives a null useful signal. If the object is moving, a signal is obtained which is $\frac{1}{2}$ that which would be observed in the absence of a grid;

(2) the product of the incident radiation and the first harmonic of amplitude $2/\pi$ which furnishes the main signal for a fixed object;

(3) the products of the incident radiation and the harmonics 3, 5, 7 . . . of respective amplitudes $\frac{2}{3}\pi$, $2/5\pi$, $2/7\pi$ . . . which may be ignored in the case of a grid having a high spatial frequency, of the order of the maximum object frequency to be transmitted. In the case of a grid whose spatial frequency is low with respect to the object frequencies, the latter may then be comparable to those of the successive harmonics of the grid; therefore these products are disadvantageous and it is preferable to employ a substantially sinusoidal structure for the grid. This may be achieved approximately by moving the grid away from the theoretical position thereof, that is to say close to the object or to the plane of the detector surface, so that the dimension of the blur be, for example, between the fundamental spatial period and $\frac{1}{3}$ of this value which corresponds to the first harmonic.

As concerns the mean component of the radiation from the object, which corresponds to the mean temperature of the object, it is not modified by the interception by a grid of a diffusing or defocusing material. On the other hand, it is modified by the grid made of absorbent material: the temperature of the incident radiation on the detector surface is then that of the grid ($\theta_2$) increased by a quantity proportional to the difference ($\theta_m - \theta_2$) modulated by the previously defined rectangular pulse function. There is therefore a term which varies with respect to time and is proportional to ($\theta_m - \theta_2$) which must be eliminated to obtain a satisfactory restitution of the image.

Lastly, as concerns the signal $S_d$ that may be received on the detector, it is known that it is proportional at each point to the variation of temperature between two successive scannings at this point. Calculation shows that this signal comprises components which are functions of the sum and difference of the spatial frequencies of the grid ($k_G$) and object ($k_o$). Each of these components is given a first phase term which is proportional to time (of the form: $k_G \cdot v \cdot t$ in which v is the speed of the grid) and a second phase term independent of time. Calculation also shows that the signal $S_d$ is proportional to Sin ($k_G \cdot v \cdot T/2$) in which T is the interval of time between two scannings of same point. This in practice imposes $\pi/6 \leq (k_G \cdot v \cdot T/2) \leq \pi/2$, that is to say, $\pi/3T \leq k_G \cdot v \leq \pi/T$ which determines the optimum speed v of the grid for a given frequency $k_G$.

By way of example, there is given hereunder a manner of reconstituting the image of the object from the signal $S_d$ illustrated in FIG. 6. It applies to devices the detector surface of which is scanned sequentially along lines parallel to the direction XX of displacement of the grid. It applied in particular to camera tubes the pyroelectric target of which is swept by an electron beam according to a conventional television standard.

The signal $S_d$ contains terms of the following form:

$$\sin [(k_G \pm k_o) \cdot V_H \cdot t - k_G \cdot v \cdot t + \phi - (k_G \pm k_o) \cdot V_H \cdot (l \cdot t_1 + nT)]$$

in which $\phi$: phase shift independent of time $V_H$: speed of horizontal displacement of the scanning $t_1$: duration of a line;

l and n: numbers of the order respectively of the line and frame. In order, on one hand, to reconstitute the initial spatial frequency $k_o$ and, on the other hand to eliminate the time variation coming from the variable phase shift, the signal $S_d$ is multiplied by an auxiliary signal $S_a$:

$$S_a = \sin [k_G \cdot (V_H - v) \cdot t - k_G \cdot V_H (lt_1 + nT) + \phi a]$$

in which $\phi a$ is an adjustable phase shift determined in particular as a function of the fact that the different phase shifts are the more disadvantageous as the frequencies are low.

This is what is shown in FIG. 6 in which a multiplier 16, such as a linear amplifier having a wide band (exceeding 3 MHz) receives $S_d$ at a first input 14, $S_a$ at a second input 15 and delivers at its output 17 the product of the two signals $P(k_G \cdot 2k_G - k_o)$ which contains terms depending on $k_G$ and on $(2k_G - k_o)$. The signal P is thereafter filtered (element 18 in FIG. 6) so as to eliminate the frequencies other than $k_o$; the filter 18 therefore gives at the output 19 thereof the useful signal S ($k_o$).

Note that the filtering is only possible if the frequency interval ($2k_G - k_o$) is outside the domain of the object frequencies, that is to say, if $k_m$ is the maximum object frequency it is desired to transmit:

$2k_G - k_m > k_m$ or $k_g > k_m$: this type of correction is therefore only possible when the fondamental spatial frequency of the grid is higher than the maximum object frequency.

As concerns the production of the auxiliary signal $S_a$, the latter on principle requires a phase shift:

$$\phi_a - k_G \cdot V_H (l \cdot t_1 + n \cdot T)$$

which is variable at each frame and each line. This requirement may be avoided if $k_G \cdot V_H$ and $t_1$ are so chosen that the product thereof is equal to a whole number of times $2\pi$.

Moreover, the setting of the frequency of this auxiliary signal $S_a$ to the frequency $k_G(V_H - v)$ may be obtained as illustrated in FIG. 7: the signal $S_a$ is generated by a device 23; it is multiplied in an element 20 by a signal S. This signal S is obtained in taking the signal furnished by a part of the detector surface illuminated uniformly through the grid by an auxiliary source independent of the object: this signal then only has the frequency $k_G(V_H - v)$. The signal $P_1$, product of $S_a$ and S, is filtered (element 21 in the figure) so that the continuous component of this signal is obtained, which is compared by a differential amplifier 22 with a fixed value V, between $-V_M$ and $+V_M$, the maximum value $+V_M$ being reached when the two signals $S_a$ and S are in phase. The choice of the value V also determine the phase shift value $\phi a$. The error signal $\epsilon$ delivered by the comparator 22 is sent back to the element 23.

It should be stressed that, in this embodiment, the drawback that some known devices had related to excessive differences between the temperature of a chopper and the mean temperature of the object, disappears. Indeed, the multiplication by the auxiliary signal $S_a$ gives a parasite signal proportional to ($\theta_m - \theta_2$), comprising a continuous component and a component of frequency $2k_G \cdot V_H$ each of which may be easily eliminated by filtering.

Further, it is found that the treatment that the system must be subjected to is substantially simpler than those of known systems.

There was described above with reference to FIGS. 6 and 7 a manner of electrically treating the signal $S_d$ furnished by the detector surface. It is also possible to effect an optical treatment of the signal, which has the advantage of being valid for any type of scanning of the detector surface.

It consists in optically multiplying the image previously obtained on the display means by a second grid, of spatial frequency $k_{G1}$ which moves with a speed $v_1$. The magnitudes $k_{G1}$ and $v_1$ are obtaind from $k_G$ and v respectively by division and multiplication by the magnification $\gamma$ between the restituted image and the image formed on the detector surface. The phase shift $\phi_{01}$ between this second grid and the first is also adjustable. The setting of the speed $v_1$ to the speed v of the first grid can be obtained in a way similar to that described with reference to FIG. 7 by optically multiplying the signals from the two grids and controlling $v_1$ so that the continuous component of the product be set to a fixed value related to the phase shift $\phi_{01}$ between the two grids.

What is claimed:

1. A camera system comprising:
   a detector of an incident radiation from an object to be viewed, said detector being constituted by a pyroelectric material on which the incident radiation produces a spatial distribution of electric potential representing it;
   means for scanning said potential distribution;
   a partly transparent grid which moves between said object and said detector, along an axis perpendicular to said incident radiation, and produces a time continuous modulation of said incident radiation.

2. A system as claimed in claim 1, wherein the grid is moved in a plane substantially perpendicular to said incident radiation at uniform speed.

3. A system as claimed in claim 1, wherein the spatial frequency of the grid is substantially equal to the maximum spatial frequency of said object to be transmitted, said two frequencies being with respect to the region of the detector.

4. A system as claimed in claim 3, wherein said scanning means effect a scanning of said detector in lines parallel to the direction of movement of said grid, and said system further comprises means for electrically processing the signal furnished by said detector, comprising a multiplier which multiplies said signal by a sinusoidal auxiliary signal, the phase of which varies with each one of said lines and which comprises an adjustable part.

5. A system as claimed in claim 4, wherein said auxiliary signal has a frequency which is controlled in such manner that the continuous component of the product of said signal by a second auxiliary signal, furnished by at least a part of the detector illuminated uniformly through said grid, is set to a reference value.

6. A system as claimed in claim 1, wherein the spatial frequency of the grid is small with respect to the smallest spatial frequency of said object to be transmitted, said two frequencies being with respect to the region of the detector.

7. A system as claimed in claim 1, wherein said grid comprises a material absorbing said incident radiation, and in which apertures are formed so that the transparency of said grid is equal to $\frac{1}{2}$.

8. A system as claimed in claim 1, wherein said grid is consituted by a material which diffuses said incident radiation.

9. A system as claimed in claim 1, wherein said grid is constituted by a material which changes the optical path of said incident radiation.

10. A system as claimed in claim 1, wherein said grid is positioned in the immediate vicinity of said object.

11. A system as claimed in claim 10, wherein a sinusoidal grid approximation is obtained by moving away said grid from the immediate vicinity of said object.

12. A system as claimed in claim 1, wherein said grid is placed in the immediate vicinity of said detector.

13. A system as claimed in claim 12, wherein a sinusoidal grid approximation is obtained by moving away said grid from the immediate vicinity of said detector.

14. A system as claimed in claim 1, further comprising optical means which form an intermediate image of said object in an intermediate plane, said grid being positioned in said intermediate plane.

15. A system as claimed in claim 14, wherein a sinusoidal grid approximation is obtained by moving away said grid from said intermediate plane.

* * * * *